Nov. 2, 1965      C. H. SPITLER      3,215,807
FLOATING MOUNT FOR CIRCUIT BREAKERS
Filed Nov. 1, 1961
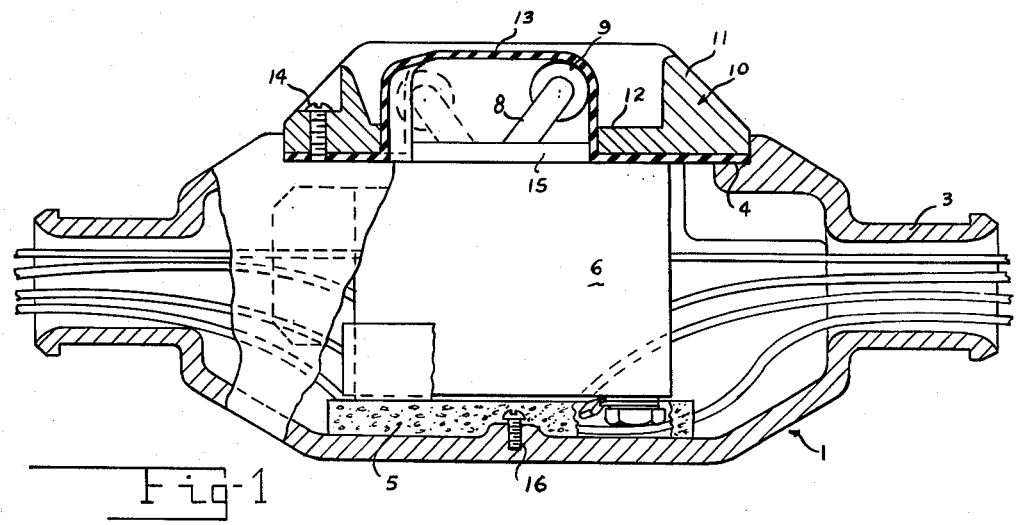
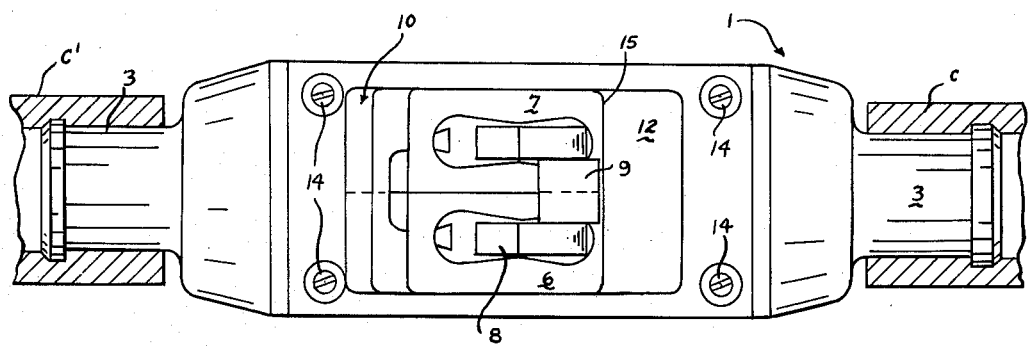
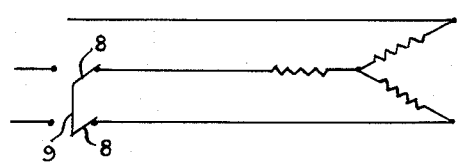
INVENTOR.
CLEM H. SPITLER
BY Tom Walker
ATTORNEY

United States Patent Office 3,215,807
Patented Nov. 2, 1965

3,215,807
FLOATING MOUNT FOR CIRCUIT BREAKERS
Clem H. Spitler, Dayton, Ohio, assignor to Master
Consolidated Inc., a corporation of Ohio
Filed Nov. 1, 1961, Ser. No. 149,361
8 Claims. (Cl. 200—168)

This invention relates to a novel circuit breaker switch device which is particularly advantageous in application to three phase systems. In a preferred form it may be most effectively employed as an integral part of a power cable or with portable power tools such as vibrators and will be so described. However, it will be obvious therefrom the form and application of the invention is not so limited and such is not intended.

Conventional circuit breakers have been prone to malfunction when applied to portable power tools. For one thing, they are quite sensitive and will readily trip when subjected to shock or vibration. In addition, they are quite inadequate to protect such tools against "single phasing," a condition that occurs when one of the wires in their usual three phase power cables is open. This latter causes a tool to overheat and many times results in serious damage. In portable vibrator units, for example, it is generally necessary to incorporate thermal protectors to partially cope with the problems of single phasing.

The present invention answers a need in the circuit breaker art above indicated. Embodiments provide circuit breaker devices which can be simply and effectively applied to portable equipment such as power tools and appliances. Moreover, they may also be incorporated in flexible power cables. Such embodiments not only function as overload safety switches having high resistance to inadvertent tripping, but they are also capable of providing maximum protection against single phasing when incorporated in polyphase systems. When applied to vibrators, for example, they eliminate the need for specialized thermal protectors and enable the vibrators to be employed in a more efficient manner. The invention further provides a novel floating mount for circuit breakers rendering them resistant to shock and vibration.

A preferred embodiment of the invention comprises a plurality of circuit breaker elements connected in parallel and having a floating mount. Each of the breaker elements may be independently connected in separate wires of a polyphase system and so arranged that an overload in any one of the wires in which they are inserted will result in a simultaneous tripping of all the circuit breaker elements. The floating mount of the breaker elements renders them resistant to inadvertent tripping. Thus, a tool to which the invention is applied will accurately respond to any type of overload, including that resulting from a single phasing, and immediately shut down. The advantages thereof are believed obvious.

A primary object of the invention is to provide a novel circuit breaker device which may be economically fabricated, more efficient and satisfactory in use and unlikely to malfunction.

Another object of the invention is to provide a novel circuit breaker device particularly advantageous in application to portable power tools.

A further object of the invention is to provide a novel circuit breaker unit which may be incorporated in portable equipment, and which is highly resistant to inadvertent tripping.

Another object of the invention is to provide a novel circuit breaker device capable of providing protection against "single phasing."

An additional object of the invention is to provide a novel circuit breaker device which can be applied to a plurality of wires in a polyphase system in a manner that an overload in one of the wires will result in an opening in each of the wires to which the device is applied.

A further object of the invention is to provide a circuit breaker device which can be physically integrated in a flexible power cable employed in a polyphase system and may be simultaneously used as an on-off switch.

Another object of the invention is to provide a circuit breaker device which can be physically connected for movement with a portable power tool, such as a vibrator.

An additional object of the invention is to provide a circuit breaker installation providing the breaker elements with a floating resilient mount.

A further object of the invention is to provide a circuit breaker switch possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings.

Referring to the accompanying drawing wherein is shown one but obviously not necessarily the only form of embodiment of the invention, FIG. 1 is a cross-sectional view of a circuit breaker assembly such as provided by the present invention;

FIG. 2 is a top view of the device of FIG. 1 (with parts removed for clarity) as incorporated in a power cable; and FIG. 3 is a schematic showing the nature of application of the device of FIGS. 1 and 2 to a cable providing three phase power.

Like parts are indicated by similar characters of reference throughout the several views.

Referring to the accompanying drawing, there is shown therein a generally elongated rectangular casing 1, of aluminum alloy, for example, having openings in either end respectively defined by tubular projections 3. A further opening in the top of casing 1 is defined by a recessed flange 4 formed integral therewith. Anchored to the inner wall of the casing, adjacent its bottom, is a tray-like receptacle 5 of foamed plastic or rubber which nests a pair of conventional circuit breakers 6 and 7 which are integrally connected in parallel. The trip levers 8 of the circuit breakers 6 and 7 project upwardly and outwardly of the casing 1 through the opening at the top defined by the flange 4. The projected extremities of the trip levers 8 are connected by relatively rotatable roller means 9.

Seated to the shoulder provided by the recessed flange 4 is a cover element 10 having a central generally rectangular opening. The outer peripheral portion 11 of the cover element 10 is vertically extended relative its inner peripheral portion 12 to form a wall thereby. Interposed between the flange 4 of the casing 1 and the bottom or seating surface of the cover element 10 is the peripheral edge portion of a flexible sheet-like rubber element 13 which bridges the opening defined by the flange 4 as well as the central opening in the cover 10 which is aligned therewith. Screws 14 are engaged through the cover element 10, the element 13 and into the flange 4 to fix the respective elements to the casing. The flexible sheet element 13 is thus established to extend over and cover the trip levers including the connecting roller means 9. The projection of the roller means 9 is such that it lies within the shelter of the wall defined by the outer peripheral portion 11 of the cover element 10.

Boss portions 15 on the breaker elements 6 and 7 project upwardly within the opening defined in the cover 10 by the portion 12 to be lined by portions of the flexible sheet 13, as shown in FIG. 1 of the drawing.

The circuit breakers 6 and 7 are thereby resiliently confined between the cover 10 with portions of the sheet 13 therebetween, and the resilient tray 5. The circuit breakers are therefore relatively free. Such support and confinement permits a free vertical floating thereof, resiliently buffered both vertically and peripherally by the sheet 13 and the material of the tray 5. Thus, the mount provides for shock and vibration absorption in all directions.

A connection 16 within the body of casing 1 provides for connection of ground wires thereto. In addition, each of the circuit breaker elements 6 and 7 has a pair of terminals enabling individual insertion thereof in a separate wire of a polyphase system.

When the device above described is applied, for example, to a portable vibrator having connections for three phase power, there are four wires leading from the tool, including a ground, which are received through one tubular projection 3. The ground is anchored to the body of casing 1 at 16. In addition, each of the circuit breaker elements 6 and 7 have one of their terminals connected to one of the wires of the three phase connections at the tool while the fourth wire is passed through the casing 1 to directly connect to a power source. As seen in FIG. 1 of the drawings, appropriate wires are led from the other terminals of the respective circuit breaker elements to the power source to complete the three phase system while the ground is also extended from 16 through the opposite tubular projection 3. The schematic of FIG. 3 of the drawings indicates the integration of the circuit breaker device provided in the three phase system.

The casing 1 and the circuit breaker structure as provided therein enables it to be directly connected to the vibrator per se or in a power cable forming a part thereof. For example, FIG. 2 of the drawings indicates the device above described as integrated intermediately of a flexible power cable, the cable portion C to one end being attached to the tool and carrying the four wires leading therefrom and the cable portion C' to the other end carrying the four wires for connection through a receptacle to a three phase power source. The selective connections of these wires within the casing 1 are indicated in FIGS. 1 and 3 of the drawings and to the extent previously described.

The effective application of the invention device to portable equipment is enabled by the mount of the breaker elements as provided within the casing 1 which is such to render them highly resistant to inadvertent tripping due to shock or vibration. The mount is resilient and floating yet sufficiently positive for adequate protection of the element involved. In use the device offers maximum protection. As soon as an overload occurs in a single wire of the system provided, the one of the circuit breaker elements in such wire will respond to carry its trip lever 8 to an open position and immediately and simultaneously carry the trip lever 8 connected in parallel therewith to an open position, providing a substantially immediate shut down of the tool. Thus, in the event of any malfunction producing an overload, including single phasing, the device provided will produce a prompt shut down of the tool and thereby avoid damage thereto. The advantages thereof are believed obvious.

It is to be noted that the nature of the flexible cover element 13 and its relation to the casing 1 is such to enable a relatively sealed moistureproof safety device. Moreover, the flexibility of the element 13 enables the manipulation of the trip levers therethrough very readily in a manner facilitated by the roller means 9. It should be further recognized that the device as incorporated in a portable tool can simultaneously serve as its on-off switch lending versatility thereto.

Thus, the invention is believed to provide an answer to the needs previously indicated with respect to the art in question. The invention device is simple, easy to fabricate and offers maximum and efficient protection, particularly of portable equipment, to a degree not previously contemplated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect. and the invention is therefore claimed in any of its forms or modifications within the legitimate and valid scope of the appended claims.

Having thus described my invention, I claim:

1. A circuit breaker assembly comprising, a casing, circuit breaker means, a resilient tray nesting said means in said casing, and means other than said tray resiliently confining said circuit breaker means to said tray providing for a free floating of said circuit breaker means between said confining means and said tray.

2. In a power cable for portable tools, a circuit breaker unit including a relatively rigid damage resistant housing having wire receiving openings and adapted to be installed in said cable, said housing having a closed bottom portion and in opposed relation thereto an aperture, a resilient pad in said housing resting on the closed bottom thereof, a circuit breaker seated on said pad and projecting upwardly therefrom toward said aperture, said circuit breaker having electrical connections to the wires in said cable, a cover detachably mounted on said housing in superposed relation to said aperture therein and having a wall portion generally parallel to the closed bottom portion of said housing confining and holding said circuit breaker unit to a seat on said pad, there being a through opening in said wall portion, and said circuit breaker having a boss portion received therein, switch lever means projecting from said circuit breaker through and beyond said through opening, and an auxiliary sheet-like cover made of a flexible, yielding material having a recessed portion in overlying, enclosing relation to said switch lever means and a laterally projecting portion received between said wall portion of the first said cover and said circuit breaker, a connecting portion of said auxiliary cover between said recessed portion and said laterally projecting portion thereof passing between said boss portion of said circuit breaker and the wall of the said through opening in the first said cover confining and holding said circuit breaker in a lateral sense.

3. A circuit breaker unit according to claim 2, characterized by an upstanding flange on said cover in surrounding protecting relation to said projecting switch lever means.

4. A circuit breaker unit according to claim 2, wherein said housing has a generally tubular configuration, the wire receiving openings therein being formed at opposing ends of the housing where they are defined as through reduce diameter passages through which cable sections extend for attachment to the contained circuit breaker.

5. A circuit breaker assembly comprising, a casing, circuit breaker means including projecting switch lever means, a resilient tray in the bottom of said casing seating said circuit breaker means therein, and means other than said tray resiliently confining said circuit breaker means to said tray providing for a free floating of said circuit breaker means between said confining means and said tray, said confining means including a flexible sheet member stretched over said circuit breaker means and formed with a recessed portion receiving said switch lever means, said recessed portion being deformable for manipulative rocking of said switch lever means therethrough.

6. In a power cable for use with portable power tools and the like, a casing having an opening therein, wires for providing three phase power extending through said casing, load sensitive elements positioned within said casing individually inserted in separate wires, trip means projected from each of said elements to the area of the opening in said casing and having means connecting them for conjoint operation, said trip means being subject to both automatic and manual operation, a resilient tray in said casing in generally opposed spaced relation to said opening therein and seating said load sensitive elements, and a flexible covering sealing the opening in said casing and deformable to enable the manual operation of said trip means therethrough, edges of said covering extending into said casing and engaging load sensitive elements to provide, in cooperation with said resilient tray, a cushioned mounting therefor.

7. A circuit breaker assembly comprising a casing, circuit breaker means including projecting trip lever means therefor, a resilient tray nesting said circuit breaker means in said casing, and means other than said tray resiliently confining said circuit breaker means to said tray providing for a free floating of said circuit breaker means between said confining means and said tray, said confining means including a flexible sheet member stretched over said trip lever means and positioned between said casing and said circuit breaker means in an opposing relation to said resilient tray.

8. In a power cable for portable tools, a circuit breaker unit including a relatively rigid damage resistant housing having wire receiving openings and adapted to be installed in said cable, said housing having a closed bottom portion and in opposed relation thereto an aperture, a resilient pad in said housing resting on the closed bottom thereof, a circuit breaker seated on said pad and projecting upwardly therefrom toward said aperture, said circuit breaker having projecting trip lever means received in said aperture, said circuit breaker having electrical connections to the wires in said cable, a cover deteachably mounted on said housing in superposed relation to said aperture therein and having a wall portion generally parallel to the closed bottom of said housing, there being a through opening in said wall portion, and a flexible sheet member extending loosely over the through opening in the wall portion of said cover and into said opening in a contacting relation to the underside of said wall portion, said circuit breaker being resiliently confined and held to a seat on said tray by said cover member acting through said flexible sheet member, said trip lever means being operable through said flexible sheet member at the location of said through opening in said cover.

References Cited by the Examiner

UNITED STATES PATENTS

| | | | |
|---|---|---|---|
| 1,288,820 | 12/18 | Braunwarth | 317—46 X |
| 2,750,480 | 6/56 | Freeman | 200—168 |
| 2,773,150 | 12/56 | Wintle | 200—168 |
| 2,842,636 | 7/58 | Foster | 200—166 |
| 2,842,644 | 7/58 | Korsgren | 200—168 |
| 2,878,332 | 3/59 | Locher | 200—50 |
| 2,903,541 | 9/59 | Berry | 200—168 |
| 2,984,725 | 5/61 | Hubell | 200—168 |

FOREIGN PATENTS 1,093,456 11/60 Germany.

BERNARD A. GILHEANY, *Primary Examiner.*

ROBERT K. SCHAEFER, *Examiner.*